(12) United States Patent
Kley et al.

(10) Patent No.: US 6,787,768 B1
(45) Date of Patent: Sep. 7, 2004

(54) METHOD AND APPARATUS FOR TOOL AND TIP DESIGN FOR NANOMACHINING AND MEASUREMENT

(75) Inventors: Victor B. Kley, Berkeley, CA (US); Robert T. LoBianco, Sunnyvale, CA (US)

(73) Assignee: General Nanotechnology LLC, Berkeley, CA (US)

(*) Notice: Subject to any disclaimer, the term of this patent is extended or adjusted under 35 U.S.C. 154(b) by 0 days.

(21) Appl. No.: 10/093,947

(22) Filed: Mar. 7, 2002

Related U.S. Application Data

(60) Provisional application No. 60/274,500, filed on Mar. 8, 2001.

(51) Int. Cl.$^7$ ............................................. H01L 21/306
(52) U.S. Cl. .................... 250/306; 250/492.2; 318/592; 318/685; 318/696; 310/317; 324/762; 216/2; 216/62; 216/83
(58) Field of Search ............................ 250/306, 492.2; 318/592, 685, 696; 310/317; 324/762; 216/2, 62, 83

(56) References Cited

U.S. PATENT DOCUMENTS

| | | |
|---|---|---|
| 3,586,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingam et al. |
| RE32,457 E | 7/1987 | Matey |
| 4,681,451 A | 7/1987 | Guerra et al. |

(List continued on next page.)

FOREIGN PATENT DOCUMENTS

| | | |
|---|---|---|
| EP | 0325056 | 7/1989 |
| JP | 61-133065 | 6/1986 |
| JP | 1-262403 | 10/1989 |
| JP | 7-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |

OTHER PUBLICATIONS

Ager et al., "Multilayer hard carbon films with low wear rates," *Surface and Coatings Technology*, 91:91–94 (1997).
Betzig et al "Near–Field Optics: Microscopy Spectroscopy and Surface Modification Beyond the Diffraction Limit" Science 257:(1992).
Dai et al. "Nanotubes as nanoprobes in scanning probe microscopy," Nature 384:147–150 (1996).

(List continued on next page.)

*Primary Examiner*—John R. Lee
*Assistant Examiner*—Zia R. Hashmi
(74) *Attorney, Agent, or Firm*—Townsend and Townsend and Crew LLP

(57) ABSTRACT

A single-body structure is presented for use as a tool tip for making modifications and/or collecting measurements on a target object. The single-body structure comprises a first end portion, a second end portion opposite the first portion, and a mid portion between the first and second end portions, wherein a central axis can be defined extending from the first end portion to the second end portion, and wherein the single-body structure has a maximum linear dimension of approximately 50 microns or less. The single-body structure may be comprised of diamond. One of the first and second end portions may have a larger cross sectional area, in a plane perpendicular to the central axis, than does the other of the first and second end portions. One of the first and second end portions may have a larger cross sectional diameter, in at least one direction perpendicular to the central axis, than does the other of the first and second end portions.

72 Claims, 8 Drawing Sheets

U.S. PATENT DOCUMENTS

| | | |
|---|---|---|
| 4,697,594 A | 10/1987 | Mayo, Jr. |
| 4,831,614 A | 5/1989 | Duerig et al. |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick et al. |
| 5,018,865 A | 5/1991 | Ferrell et al. |
| 5,025,346 A | 6/1991 | Tang et al. |
| 5,038,322 A | 8/1991 | Van Loenen |
| 5,043,577 A | 8/1991 | Pohl et al. |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,308 A | 9/1992 | Miyauchi |
| 5,155,589 A | 10/1992 | Gere |
| 5,166,520 A | 11/1992 | Prater et al. |
| 5,187,367 A | 2/1993 | Miyazaki et al. |
| RE34,214 E | 4/1993 | Carlsson et al. |
| 5,210,410 A | 5/1993 | Barrett |
| 5,216,631 A | 6/1993 | Sliwa, Jr. |
| 5,220,555 A | 6/1993 | Yanagisawa et al. |
| 5,231,286 A | 7/1993 | Kajimura et al. |
| 5,241,527 A | 8/1993 | Eguchi et al. |
| 5,249,077 A | 9/1993 | Laronga et al. |
| 5,254,854 A | 10/1993 | Betzig |
| 5,260,824 A | 11/1993 | Okada et al. |
| 5,276,672 A | 1/1994 | Miyazaki et al. |
| 5,278,704 A | 1/1994 | Matsuda et al. |
| 5,283,437 A | 2/1994 | Greschner et al. |
| 5,289,408 A | 2/1994 | Mimura et al. |
| 5,297,130 A | 3/1994 | Tagawa et al. |
| 5,299,184 A | 3/1994 | Yamano et al. |
| 5,302,239 A | 4/1994 | Roe et al. |
| 5,308,974 A | 5/1994 | Elings et al. |
| 5,317,152 A | 5/1994 | Takamatsu et al. |
| 5,317,533 A | 5/1994 | Quate et al. |
| 5,319,961 A | 6/1994 | Matsuyama et al. |
| 5,319,977 A | 6/1994 | Quate et al. |
| RE34,708 E | 8/1994 | Hansma et al. |
| 5,338,932 A | 8/1994 | Theodore et al. |
| 5,343,460 A | 8/1994 | Miyazaki et al. |
| 5,349,735 A | 9/1994 | Kawase et al. |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi et al. |
| 5,389,475 A | 2/1995 | Yanagisawa et al. |
| 5,392,275 A | 2/1995 | Kawada et al. |
| 5,393,647 A | 2/1995 | Neukermans et al. |
| 5,396,483 A | 3/1995 | Matsuda et al. |
| 5,408,094 A | 4/1995 | Kajimura |
| 5,412,641 A | 5/1995 | Shinjo et al. |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto et al. |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi et al. |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto et al. |
| 5,623,476 A | 4/1997 | Eguchi et al. |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano et al. |
| 5,721,721 A | 2/1998 | Yanagisawa et al. |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bourgoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimzewski et al. |
| 6,066,265 A * | 5/2000 | Galvin et al. ............... 216/2 |
| 6,101,164 A | 8/2000 | Kado et al. |
| 6,144,028 A | 11/2000 | Kley |
| 6,173,604 B1 | 1/2001 | Xiang et al. |
| 6,229,138 B1 | 5/2001 | Kley |
| 6,229,609 B1 | 5/2001 | Muramatsu et al. |
| 6,252,226 B1 | 6/2001 | Kley |
| 6,265,711 B1 | 7/2001 | Kley |
| 6,337,479 B1 | 1/2002 | Kley |
| 6,340,813 B1 | 1/2002 | Tominaga et al. |
| 6,353,219 B1 | 3/2002 | Kley |
| 2002/0007667 A1 | 1/2002 | Pohl et al. |

OTHER PUBLICATIONS

Davis "Deposition characterization and device development in diamond silicon carbide and gallium nitride thin films" J. Vac. Sci. Technol. A 11(4). Jul./Aug. (1993).

Diaz, D.C., et al., An Improved Fabrication Technique for Porous Silicon, Rev. Sci. Instrum.64 (2), Feb. 1993, pp. 507–509.

Givargizov et al "Growth of diamond particles on sharpened silicon tips" Materials Letters 18:(1993).

Gomyou, H., et al. Effect of Electrochemical Treatments on the Photoluminescence from Porous Silicon, J. Electrochem. Soc., vol. 139, No. 9, Sep. 1992, pp. L86–L88.

Nossarzewska–Orlowska, E., et al., Photoluminescence Properties of Porous Silicon Prepared by Electrochemical Etching of Si Epitaxial Layer, Acta Physica Polonica A, No. 4, vol. 84 (1993), pp. 713–716.

Rasmussen et al. "Fabrication of an All–metal Atomic Force Microscope Probe," IEEE (1997).

Rossow, U., et al., Influence of the Formation Conditions on the Microstructure of Porous Silicon Layers Studied by Spectroscopic Ellipsometry, Thin Solid Films, 255 (1995), pp. 5–8.

Smestad, G., et al., Photovoltaic Response in Electrochemically Prepared Photoluminescent Porous Silicon, Solar Energy Materials and Solar Cells, 26 (1992), pp. 277–283.

Tang, William Chi–Keung, "Electrostatic comb drive for resonant sensor and actuator applications," Abstract of dissertation at the University of California at Berkeley (1990).

Toledo–Crow et al "Near–field differential scanning optical microscope with atomic force regulation" Appl. Phys. Lett. 60: (1992).

Van Hulst et al "Near–field optical microscope using a silicon–nitride probe" Appl. Phys. Lett. 62: (1993).

Watson et al "The Radiation Patterns of Dielectric Rods—Experiment Theory" Journal of Applied Physics 19: (1948).

* cited by examiner

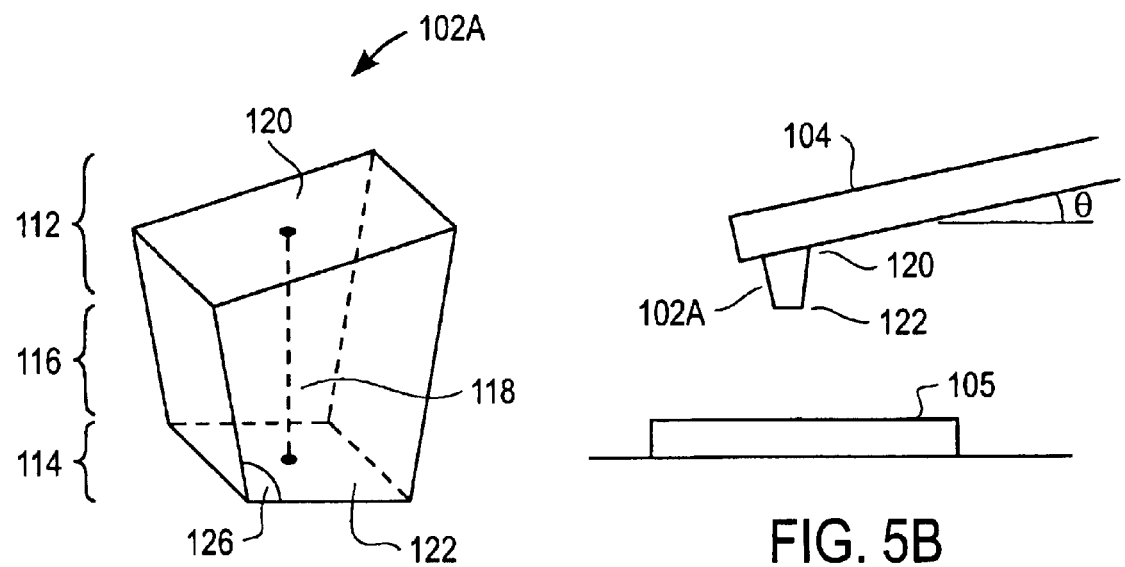
FIG. 5A
FIG. 5B
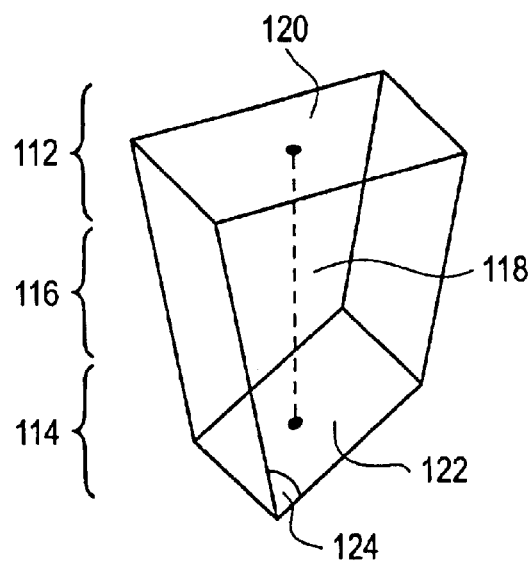
FIG. 5C

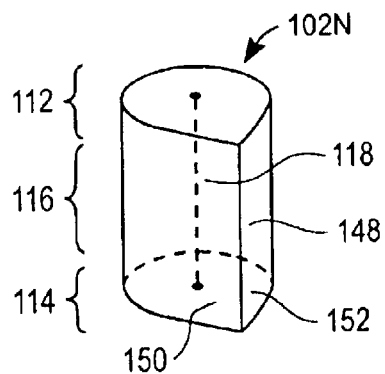
FIG. 11
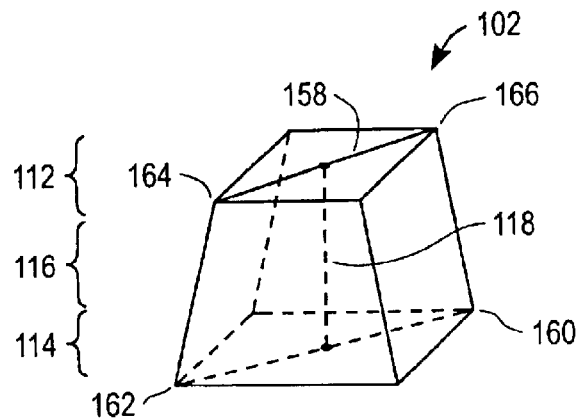 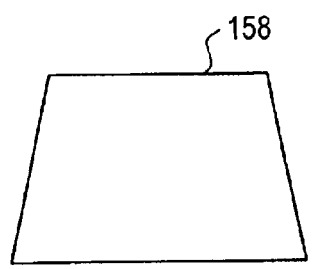
FIG. 12A  FIG. 12B
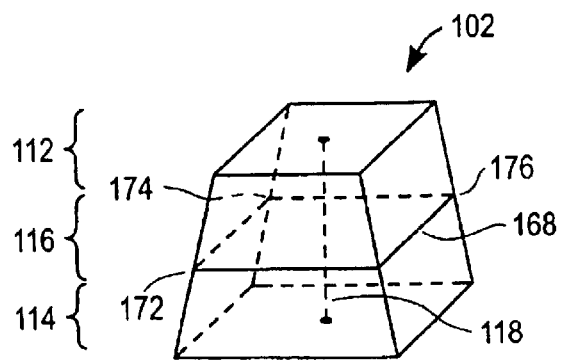 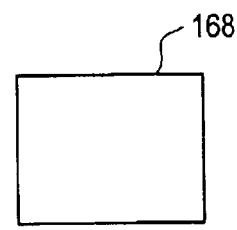
FIG. 12C  FIG. 12D

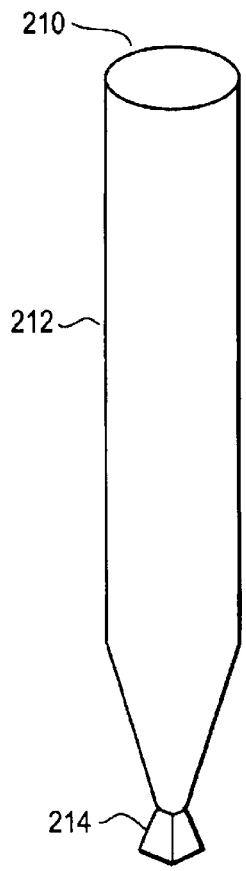
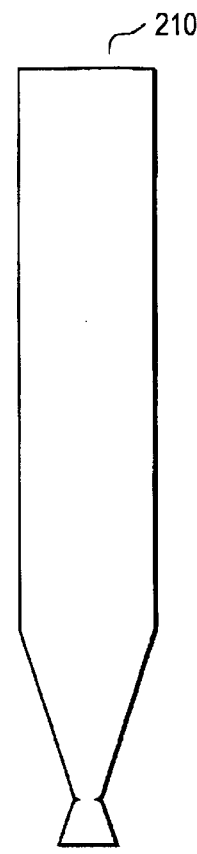
FIG. 15A  FIG. 15B
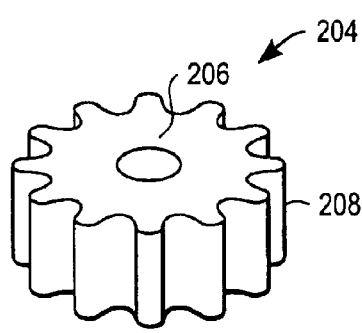
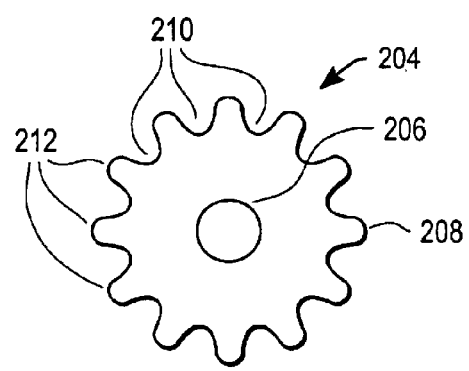
FIG. 14A  FIG. 14B

METHOD AND APPARATUS FOR TOOL AND TIP DESIGN FOR NANOMACHINING AND MEASUREMENT

CROSS-REFERENCES TO RELATED APPLICATIONS

This application claims priority from the following provisional application, the entire disclosure of which is incorporated by reference in its entirety for all purposes:

U.S. application Ser. No. 60/274,500, filed Mar. 08, 2001 by Victor B. Kley and Robert T. LoBianco for "Tool and Tip Designs for Nanomachining and Measurement."

The following six U.S. patent applications, including this one, are being filed concurrently and the disclosure of each other application is incorporated by reference in this application in its entirety for all purposes:

U.S. patent application Ser. No. 10/094,148, filed Mar. 7, 2002 by Victor B. Kley for "Method and Apparatus for Scanning in Scanning Probe Microscopy and Presenting Results";

U.S. patent application Ser. No. 10/093,842, filed Mar. 7, 2002 by Victor B. Kley for "Nanomachining Method and Apparatus";

U.S. patent application Ser. No. 10/094,408, filed Mar. 7, 2002 by Victor B. Kley for "Active Cantilever for Nanomachining and Metrology";

U.S. patent application Ser. No. 10/094,411, filed Mar. 7, 2002 by Victor B. Kley for "Methods and Apparatus for Nanolapping";

U.S. patent application Ser. No. 10/094,149, filed Mar. 7, 2002 by Victor B. Kley for "Low Friction Moving Interfaces in Micromachines and Nanomachines"; and U.S. patent application Ser. No. 10/093,947, filed Mar. 7, 2002 by Victor B. Kley and Robert T. LoBianco for "Method and Apparatus for Tool and Tip Design for Nanomachining and Measurement".

The following U.S. patents are incorporated by reference in their entirety for all purposes:

U.S. Pat. No. 6,144,028, issued Nov. 07, 2000 to Victor B. Kley for "Scanning Probe Microscope Assembly and Method for Making Confocal, Spectrophotometric, Near-Field, and Scanning Probe Measurements and Associated Images;"

U.S. Pat. No. 6,252,226, issued Jun. 26, 2001 to Victor B. Kley for "Nanometer Scale Data Storage Device and Associated Positioning System;"

U.S. Pat. No. 6,337,479, issued Jan. 08, 2002 to Victor B. Kley for "Object Inspection and/or Modification System and Method;" and U.S. Pat. No. 6,339,217, issued Jan. 15, 2002 to Victor B. Kley for "Scanning Probe Microscope Assembly and Method for Making Confocal, Spectrophotometric, Near-Field, and Scanning Probe Measurements and Associated Images."

The disclosure of the following published PCT application is incorporated by reference in its entirety for all purposes:

WO 01/03157 (International Publication Date: Jan. 11, 2001) based on PCT Application No. PCT/US00/18041, filed Jun. 30, 2000 by Victor B. Kley for "Object Inspection and/or Modification System and Method."

BACKGROUND OF THE INVENTION

This invention is related generally to the field of Atomic Force Microscopy (AFM), Scanning Tunneling Microscopy (STM), Near field Scanning Optical Microscopy (NSOM), NanoSpectroPhotometry (NSP), NanoPolarimetry (NP), Magnetic Field Microscopy (MFM) and any other methods adaptable and suitable to guide scanning and nanomachining techniques. These technologies are sometimes collectively referred to as Scanning Probe Microscopy (SPM). Specifically, the present invention relates generally to micro-objects (structures smaller than 200 microns) and more particularly to micro-objects used as tool tips in a SPM system for making measurements and/or modifications on a target object.

An AFM works by scanning a tip over a surface much the same way as a phonograph needle scans a record. The tip is located at the end of a cantilever beam and positioned over the surface to be scanned. The combination of the cantilever beam and tip is sometimes referred to collectively as a scanning probe or simply a probe.

AFM techniques rely on the effects of the inter-atomic interactions, such as van der Waals forces, that arise between the atoms in the structure of the tip and the atoms at the surface being imaged. As the tip is attracted to the surface, the cantilever beam is deflected. The magnitudes of the deflections correspond to the topological features of the atomic structure of the surface being scanned. The AFM can work with the tip touching the sample (contact mode), or the tip can tap across the surface (tapping mode), or made to not touch the surface at all (non-contact mode, which is the preferred embodiment).

STM techniques rely on the fact that the electron probability cloud associated with the atoms at the surface extends a very small distance above the surface as described by the quantum physical model. When a tip is brought sufficiently close to such a surface, there is an increasingly stronger probability of an interaction (current) between the electron cloud on the surface and that of the tip atom. An electric tunneling current flows when a small voltage is applied. The tunneling current is very sensitive to the distance between the tip and the surface. These changes in the tunneling current with distance as the tip is scanned over the surface are used to produce an image of the surface.

Nanomachining involves removal, addition, or movement of material on a surface in a controlled manner to attain specific surface features. Typically, an appropriate scanning probe is manipulated so that its tip comes into contact with a surface to be nanomachined. The scanning probe is then translated along a pre-programmed vector, producing a scraping action across the contacted surface and removing an amount of material from the surface. An appropriate feed is applied to control the amount of material removed. This is repeated until the desired features are achieved. Any surface which is exposed to contact by the scanning probe can be nanomachined. Thus, for example the walls of a vertical structure can be nanomachined using a scanning probe having an appropriately shaped tip applied to the wall with an appropriate feed force.

FIG. 1 is a generalized diagram illustrating a typical SPM system 10. A scanning probe 12 is the workhorse of the SPM. A typical probe comprises a cantilever and a tip disposed at the free end of the cantilever. Various tip shapes and configurations suitable for scanning and nanomachining are disclosed in the various above-identified commonly owned issued patents and commonly owned, co-pending patent applications.

FIG. 2 shows a typical arrangement of a scanning probe 12 suitable for use with the present invention. A cantilever 14 is attached to a body member 16 which provides structure for attachment to a probe translation apparatus. Disposed at the free end of the cantilever is an appropriately shaped probe tip 102.

Referring back to FIG. 1, the probe 12 can be coupled to a first translation stage 18. The first translation stage can provide movement of the probe in the X-Y plane. By convention, the X-Y plane is the plane parallel to the major surface of a workpiece 20. Thus, the probe can be positioned in the X-Y position relative to the workpiece by the first translation stage. The first translation stage can also provide movement of the probe in the Z-direction and thus position the probe in three-dimensional space relative to the workpiece. Such first translation stages are known and well understood devices. Typically, they are piezoelectric devices.

Alternatively, a second translation stage 22 can be provided. The workpiece 20 can be affixed to the second translation stage to provide X-Y motion of the workpiece relative to the probe 12. Furthermore, the second translation stage can provide motion of the workpiece in the Z direction relative to the probe. Such stages are typically linear motors, or precision ball screw stages or combinations thereof with linear scale or interferometric position feedback.

The relative motion between the probe 12 and the workpiece 20 can be achieved by any of a number of techniques. The probe can be translated in three dimensions while maintaining the workpiece in a stationary position. Conversely, the workpiece can move relative to a stationary probe. Both the probe and the workpiece can be moved in a coordinated fashion to achieve rapid positioning. The first translation stage 104 might provide only X-Y motion, while Z-axis positioning is provided by the second translation stage 106; or vice-versa. These and still other combinations of concerted motions of the probe and the workpiece can be performed to effect relative motion between the probe and the workpiece.

A detection module 24 is coupled to detect signal received from the scan probe 12. Many detection techniques are known. For example, if the probe is operated in AFM (atomic force microscopy) mode, the cantilever resonance point is shifted by the interatomic forces acting between the tip and the surface as the tip is scanned across the surface. A generalized controller 26 can be configured to provide various computer-based functions such as controlling the components of the system 10, performing data collection and subsequent analysis, and so on. Typically, the controller is some computer-based device; for example, common architectures are based on a microcontroller, or a general purpose CPU, or even a custom ASIC-based controller. A user interface 28 is provided to allow a user to interact with the system. The "user" can be a machine user. A machine interface might be appropriate in an automated environment where control decisions are provided by a machine.

A data store 30 contains various information to facilitate scanning and nanomachining operations and for overall operation of the system 10. The data store contains the programming code that executes on the controller 26. The data store shown in the figure can be any appropriate data storage technology, ranging from a single disk drive unit to a distributed data storage system.

In the past, tool tips used to make measurements and/or modifications on a target object in a system such as the system 10 have been unable to measure or modify extremely fine features on the target object because such tool tips have not been successfully reduced to sufficiently small physical dimensions. As features to be modified or measured become smaller and smaller, the relatively immense size of known tool tips has become a limiting factor in the performance achievable using such tool tips. In addition, the shapes of previous tool tips failed to provide measurements that sufficiently resolve particular features and dimensions in a target object. These known shapes also failed to provide modifications requiring certain spatially confined cuts or particular cut angles.

Furthermore, previous tool tips suffered from wear and became dull with usage. The need to sharpen or replace tool tips adds significant costs in both time and expense to reduce the effectiveness of modification and/or measurement processes. The present invention describes tool tip designs that address these various problems.

BRIEF SUMMARY OF THE INVENTION

A single-body structure is presented for use as a tool tip for making modifications and/or collecting measurements on a target object. The single-body structure comprises a first end portion, a second end portion opposite the first portion, and a mid portion between the first and second end portions, wherein a central axis can be defined extending from the first end portion to the second end portion, and wherein the single-body structure has a maximum linear dimension of approximately 50 microns or less. The single-body structure may be comprised of diamond.

In one embodiment, one of the first and second end portions has a larger cross sectional area, in a plane perpendicular to the central axis, than does the other of the first and second end portions. In another embodiment, one of the first and second end portions has a larger cross sectional diameter, in at least one direction perpendicular to the central axis, than does the other of the first and second end portions. In yet another embodiment, the single-body structure contains at least one cross section having a polygonal shape selected from the group consisting of triangle, quadrilateral, pentagon, hexagon, heptagon, octagon, nonagon, and decagon.

A further understanding of the nature and advantages of the present invention may be realized by reference to the remaining portions of the specification and the drawings.

BRIEF DESCRIPTION OF THE DRAWINGS

FIG. 5A is a perspective view of a tool tip having a slanted end surface in accordance with another embodiment of the present invention;

FIG. 5B is a side view of the slanted-end-surface tool tip mounted on the tool body;

FIG. 5C is a perspective view of a tool tip having two slanted end surfaces in accordance with another embodiment of the present invention;

FIG. 11 is a perspective view of a tool tip having a side edge in accordance with another embodiment of the present invention;

FIG. 12A is a perspective view of the tool tip showing a cross section taken from a plane parallel to the central axis of the tool tip;

FIG. 12B is a frontal view of the cross section;

FIG. 12C is a perspective view of the tool tip showing a cross section taken from a plane perpendicular to the central axis of the tool tip;

FIG. 12D is a frontal view of the cross section;

FIG. 14A is a perspective view of a tool tip having a opening and a gear-shaped periphery in accordance with another embodiment of the present invention;

FIG. 14B is a cross-sectional view of the tool tip having an opening and a gear-shaped periphery;

FIG. 15A is a perspective view of a tool piece comprising a stock and a tool tip formed from a portion of the stock; and FIG. 15B is cross-sectional view of the tool piece.

DETAILED DESCRIPTION OF THE INVENTION

Introduction

Figure 1:
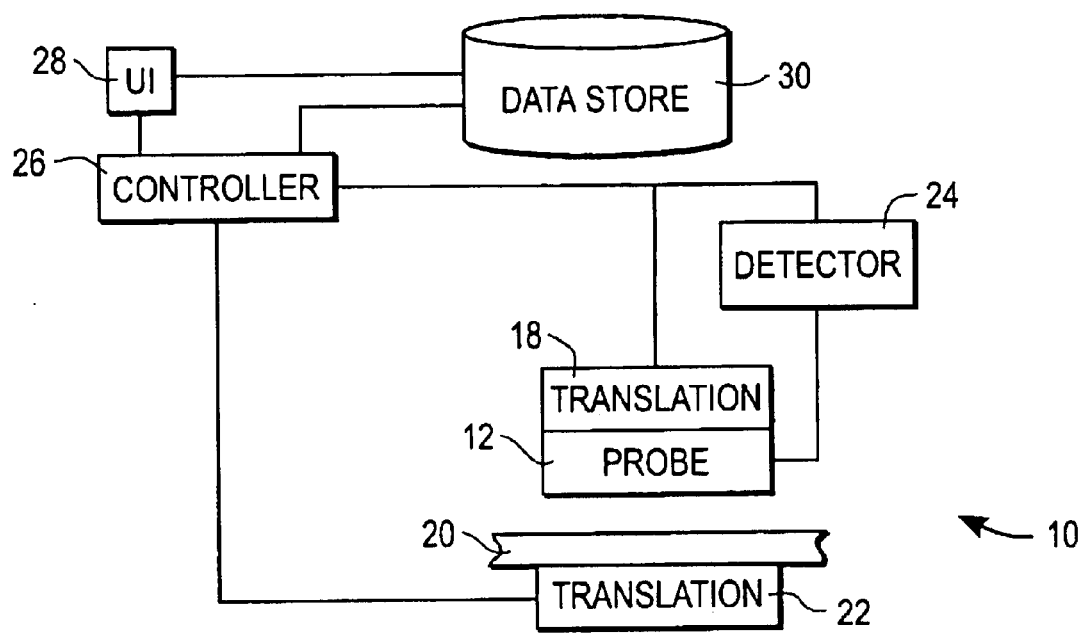
FIG. 1 is a generalized diagram illustrating a typical SPM system.
Figure 2:
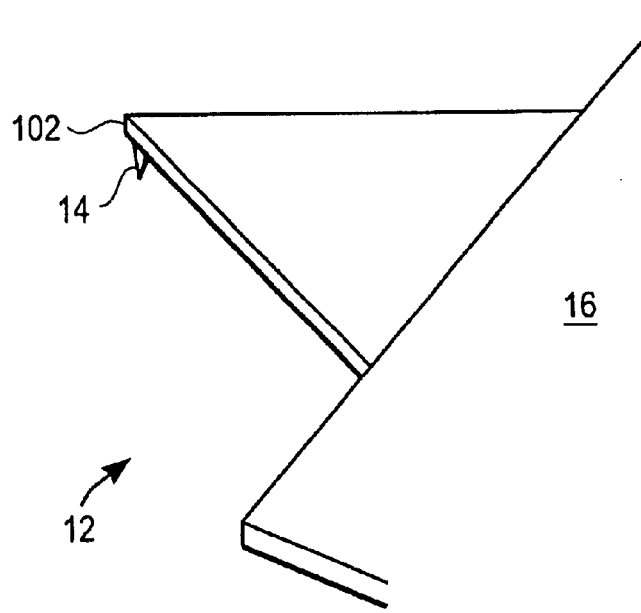
FIG. 2 shows a typical arrangement of a scanning probe suitable for use with the present invention.
Figure 3:
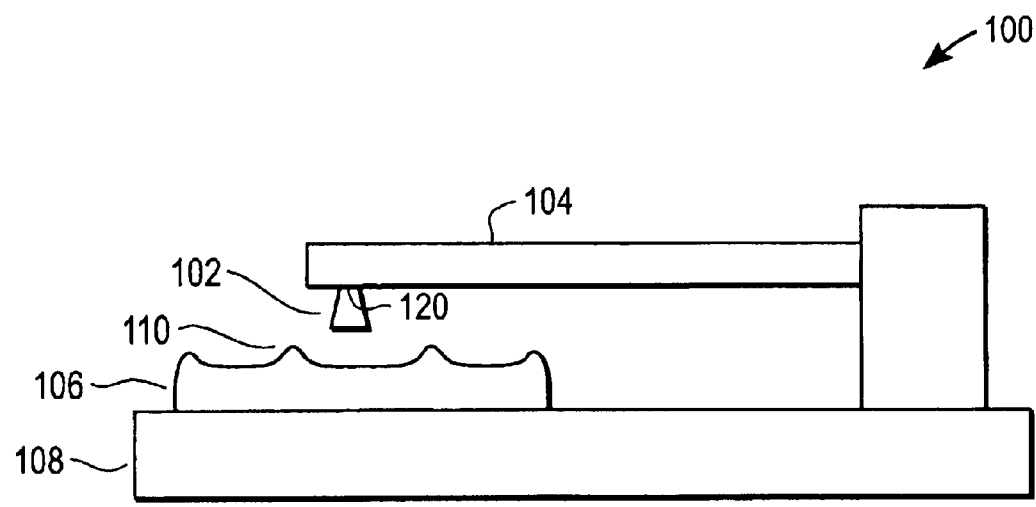
FIG. 3 is a side view of an illustrative assembly in which an embodiment of the present invention is employed.

FIG. 3 is a side view of an illustrative assembly 100 in which an embodiment of the present invention is employed. A tool tip 102 is mounted on a tool body 104, which is a part of the assembly 100. The tool tip 102 may used to make measurements on a target object 106 mounted on a base 108 of the assembly 100. For example, the tool tip 102 may detect particular features, such as a surface shape 110, on the target object 106. These measurements may include surface height, sidewall location, convex weighted limit, concave weighted limit, temperature, light intensity, tunnel current, electrical field strength, magnetic field strength, and others. The measurements may also include measurements of properties below the surface of the target object 106.

The tool tip 102 may also be used to make modifications to the target object 106, such as the removal, addition, or movement of material. For example, the tool tip 102 may perform a cut in a particular direction to shear off material from the target object 106. The tool tip 102 may be lowered into the target object 106 to create an indentation in the target object 106.

One particular embodiment of the tool tip 102 may be dedicated to making modifications, while another embodiment of the tool tip 102 may be dedicated to making measurements. Still, another embodiment of the tool tip 102 may be used for both modifications and measurements, performed simultaneously or at different times.

The tool tip 102 is held by the tool body 104 and moved relative to the target object 106. The relative movement is achieved by moving the tool body 104 with respect to the base 108 on which the target objected is mounted. The relative movement may be in the X, Y, or Z direction or a combination thereof. In addition, the relative movement may also include rotational movement along one or more axes of rotation.

Figure 4:
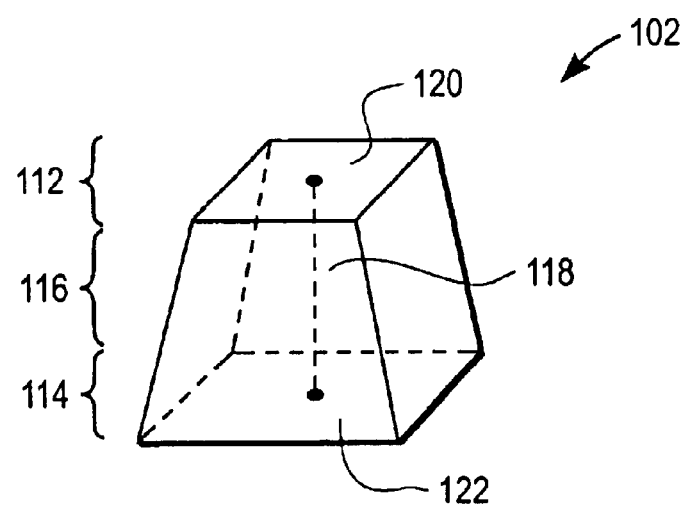
FIG. 4 is a perspective view of the tool tip in accordance with one embodiment of the present invention.

FIG. 4 is a perspective view of the tool tip 102 in accordance with one embodiment of the present invention. The tool tip 102 is a single-body structure having a first end portion 112, a second end portion 114 opposite the first end portion 112, and a mid portion 116 between the first end portion 112 and second end portion 114. Here, the first and second end portions 112 and 114 are generally speaking two opposing ends of the single-body structure corresponding to the tool tip 102. The use of the terms first and second end portions is not intended to restrict the single-body structure to any particular shape, such as an elongated shape.

A central axis 118 can be defined as extending from the first end portion 112 to the second end portion 114. The central axis 118 is not an actual physical structure, it is merely an axis of reference defined with respect to the tool tip 102 and used to describe the features of the tool tip 102. Here, the central axis 1 18 is only specified as extending from the first end portion 112 to the second end portion 114. Thus, the central axis 118 does not necessarily have to be defined to be at any particular location, such as in the center of the tool tip 102. Nor does the central axis 118 have to be defined at any particular angle, such as being parallel or perpendicular to any surfaces of the tool tip 102.

In one embodiment, the central axis 118 can be defined as being perpendicular to the plane associated with later movement of the tool tip 102 relative to the target object 106. Here, lateral movement may be defined as movement in the X and Y direction within such a plane. According to this definition, vertical movement would be defined as movement in the Z direction. Thus, the central axis 118, defined this way, would have a particular orientation, one parallel to the Z direction. However, as mentioned above, this is merely one way to define the orientation of the central axis 118, which in general is not necessarily limited to restrictions in location or orientation within the tool tip 102.

As shown in FIG. 4, the first and second end portions 112 and 114 of the tool tip 102 comprise a first end surface 120 and a second end surface 122, respectively. Here, the first and second end surfaces 120 and 122 are both perpendicular to the central axis 118. This perpendicular orientation allows the tool tip 102 to be positioned at a particular orientation if one of the end surfaces 120 or 122 is used as an attaching surface for attaching the tool tip 102 to the tool body 104. Referring back to FIG. 3 as an illustrative example, the first end surface 120 of the tool tip 102 is attached to a flat surface of the tool body 104. Because of the perpendicular orientation of the first end surface 120 with respect to the central axis 118, the tool tip 102 is positioned in a desired orientation such that the central axis 118 is perpendicular to the flat surface of the tool body 104.

Maximum Linear Dimension

The tool tip 102, as well as other tool tips described below in accordance with the present invention, has a maximum linear dimension of approximately 50 microns or less. A maximum linear dimension of 50 microns means that the longest distance, measured in a straight line, from one end of the tool tip 102 to an opposing end of the tool tip 102, is 50 microns (including the length of a stock or shaft, if one exists as a part of the tool tip 102). For the purposes of this measurement, any location on the outer surface of the tool tip 102 may be chosen as an "end" of the tool tip 102, and any other location on the outer surface of the tool tip 102 may be chosen as an "opposing end" of the tool tip 102. Thus, the measurement may be taken in any direction, along the tool tip 102 or through the tool tip 102.

Methods of Making and Handling the Tool Tip

The tool tip 102 can be lapped from an initial workpiece referred to as a stock, as disclosed in the various above-identified commonly owned issued patents and commonly owned, co-pending patent application. The tool tip 102 may be formed by first attaching the stock to a tool body, then maneuvering the tool body to control the position of the stock as a portion of the stock is lapped to form a shaped structure. Once it is formed, the shaped structure remains a portion of the stock, which is still attached to the tool body. Tool tips and tool pieces in accordance with the present invention may be comprised of diamond, carbon nitride, cubic boron nitride, boron carbide, silicon nitride, silicon carbide, tungsten carbide, and titanium nitride. When used as mechanical components, tool tips and tool pieces in accordance with the present invention may be comprised of silicon, germanium, gallium arsenide, tungsten, titanium, copper, and/or other materials well know in the art.

In a preferred embodiment, the shaped structure is retained as a portion of the stock, and the entire structure is used as the tool tip 102. By leaving undisturbed the attachment of the stock to the tool body, the shaped structure may be positioned by maneuvering the tool body. This method of forming and positioning the shaped structure allows accurate control of location and movement of the shaped structure as it is used to perform measurements, modifications, and/or other tasks.

In another embodiment, the shape structure is separated from the stock and used as the tool tip 102. The shaped structure may first be placed in the desired location using the positioning method described above, then be separated from the stock, which leaves the shaped structure in the desired position. This technique is useful to isolate the tool tip 102 as an individual structure apart from the stock. Various techniques such as lapping, sawing, breaking, and others may be used to perform this separation step.

Various techniques may be deployed to separate the tool tip from the stock portion at the fracture zone. For example, the workpiece may be subjected to a torque causing the fracture zone to mechanically fail. In another embodiment using a chemical etchant, a stock section of small cross section (i.e., the fracture zone) is etched away first. As soon as this occurs, etching is stopped by an appropriate means such as washing, mixing with a stop reagent, etc. A designated fracture zone may also be weakened prior to separation in order to aid the process of separation.

Alternatively or in addition, the fracture zone may be heated, causing it to mechanically fail or weaken due to local thermal expansion or due to a chemical process. For example, the fracture zone may be heated in the presence of a chemical reagent that etches more vigorously the relatively warmer than cooler portions of the workpiece (e.g., diamond workpiece in oxygen) thus etching through the fracture zone.

The fracture zone may be heated by various techniques. In a conductive stock (such as boron doped diamond, P or N doped silicon, all metals), a current is passed which causes the a portion (e.g., the fracture zone) in the stock having the highest resistance (smallest volume, or if the current is associated with very high frequencies where the "skin effect" is prevalent, smallest surface area) to heat up. According to another alternative, the fracture zone may be shaped such that heat passed through the workpiece builds up in fracture zone causing the fracture zone to be relatively warmer than other portions of the workpiece.

Tool Tip Shapes

FIG. 5A is a perspective view of a tool tip 102A having a slanted end surface in accordance with another embodiment of the present invention. As with the tool tip 102, the tool tip 102A has a first end portion 112, a second end portion 114, and a mid portion 116 between the first and second end portions 112 and 114. Also, the first end portion 112 of the tool tip 102A comprises a first end surface 120, and the second end portion 114 comprises a second end surface 122. The tool tip 102A has a central axis 118, as well. Here, the first end surface 120 is slanted with respect to the center axis 118. In other words, the first end surface 120 forms a non-perpendicular angle with the central axis 118.

FIG. 5B is a side view of the slanted-end-surface tool tip 102A mounted on the tool body 104. Here, the slanted first end surface 120 of the tool tip 102A is attached to a flat surface of the tool body 104. Here, the flat surface of the tool body 104 forms an angle θ with the general plane of a surface 105 to be measured and/or modified. In the present embodiment, this slanted first end surface 120 compensates for the angle θ to allow the tool tip 102A to be positioned in a desired orientation such that the second end surface 122 is parallel with the general plane of the surface to be measured and/or modified. Note that the angle θ as shown in FIG. 5B may be exaggerated for purposes of illustration.

In other embodiments, the slanted first end surface 120 can allow the tool tip 102A to be positioned in a different orientation. Not only can the magnitude of angle of such a slanted end surface be controlled, the slanted surface can also be rotated about the central axis to be in any direction. In this way, a slanted end surface of a particular tool tip may be used to attach the tool tip to a tool body to position the tool tip in a wide variety of orientations with respect to the surface to be measured and/or modified or with respect to the tool body.

FIG. 5C is a perspective view of a tool tip 102B having two slanted end surfaces in accordance with another embodiment of the present invention. As with the tool tip 102, the tool tip 102B has a first end portion 112, a second end portion 114, and a mid portion 116 between the first and second end portions 112 and 114. Also, the first end portion 112 of the tool tip 102B comprises a first end surface 120, and the second end portion 114 comprises a second end surface 122. The tool tip 102A has a central axis 118, as well. Here, both the first end surface 120 and the second end surface 122 are slanted with respect to the central axis 118. In other words, the first end surface 120 and second end surface 122 each forms a non-perpendicular angle with the central axis 118.

The second end surface 122 of the tool tip 102B forms an edge 124 with a side surface of the mid portion 116 of the tool tip 102B. Note that the edge 124 is sharper than a corresponding edge 126 of the tool tip 102A in FIG. 5A. This is true because the second end surface 122 of the tool tip 102A is perpendicular to the central axis 118, while the second end surface 122 of the tool tip 102B forms a non-perpendicular angle with the central axis 118 such that the resulting edge 124 attains a more acute profile. Thus, the sharpness of the edge 124 can be controlled by modifying the angle of the slanted second end surface 122. Also, the direction of the slanted second end surface 122 about the central axis 118 may also be modified to control the orientation and sharpness of the edge 124.

In a similar fashion as in the tool tip 102A, the tool tip 102B uses its slanted first end surface 120 to achieve positioning of the tool tip 102B in a desired orientation such that the central axis 118 of the tool tip 102B forms a non-perpendicular angle with the flat surface of a tool body, when the slanted first end surface 120 is attached to flat surface of the tool body. Although the first slanted end surface 120 of each of the tool tips 102A and 102B has been described as being attached to a tool body for purposes of illustration, the slanted end surface 120 is not the only surface capable of being used for attaching a particular tool tip to a tool body. Other surfaces and/or structures of a tool tip may be also be used for such attachment purposes.

Figure 6A:
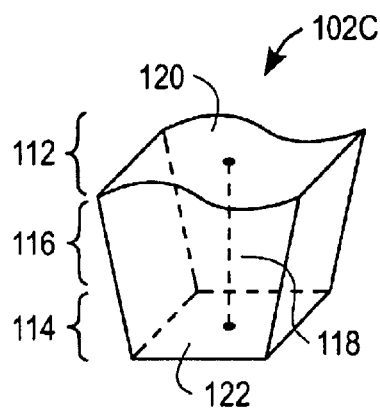
FIG. 6A is a perspective view of a tool tip having a curved end surface in accordance with another embodiment of the present invention.
Figure 6B:
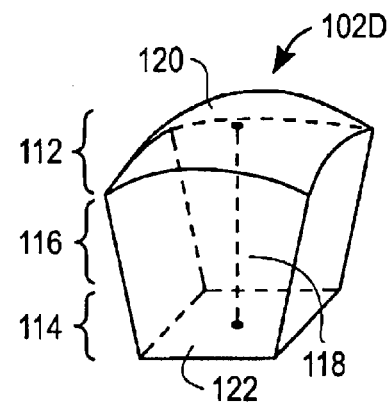
FIG. 6B is a perspective view of a tool tip having a convex end surface in accordance with another embodiment of the present invention.
Figure 6C:
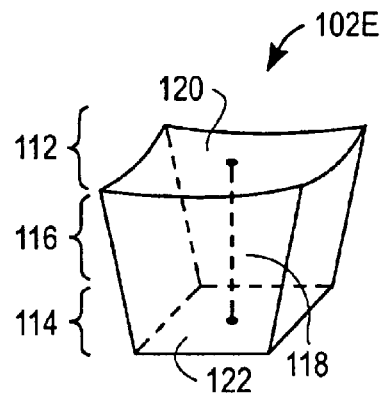
FIG. 6C is a perspective view of a tool tip having a concave end surface in accordance with another embodiment of the present invention.

FIG. 6A is a perspective view of a tool tip 102C having a curved end surface in accordance with another embodiment of the present invention. FIG. 6B is a perspective view of a tool tip 102D having a convex end surface in accordance with another embodiment of the present invention. FIG. 6C is a perspective view of a tool tip 102E having a concave end surface in accordance with another embodiment of the present invention. As with the tool tip 102 of FIG. 4, the tool tips 102C, 102E, and 102E each has a first end portion 112, a second end portion 114, a mid portion 116, a central axis 118, a first end portion 112 comprising a first end surface 120, and a second end portion 114 comprising a second end surface 122.

As shown in FIG. 6A, the first end surface 120 of the tool tip 102C is curved. Although a particular type of curved surface is shown, a curved surface generally includes any non-flat surface. Therefore, other types of curved surfaces are also within the scope of the present invention. For example, the first end surface 120 of the tool tip 102D in FIG. 6B and the first end surface 120 of the tool tip 102E of in FIG. 6C are also curved surfaces. As shown in FIG. 6B, the first end surface 120 of the tool tip 102D is convex. As shown in FIG. 6C, the first end surface 120 of the tool tip 102E is concave.

Figure 7A:
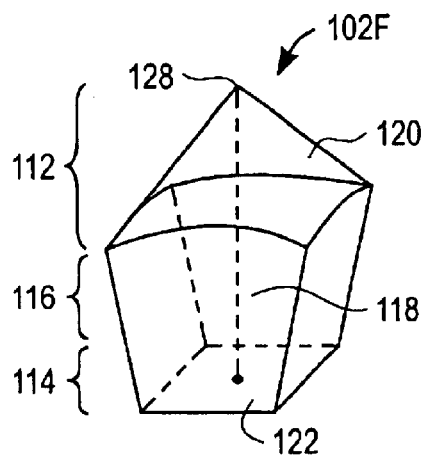
FIG. 7A is a perspective view of a tool tip having a pointed end surface in accordance with an embodiment of the present invention.
Figure 7B:
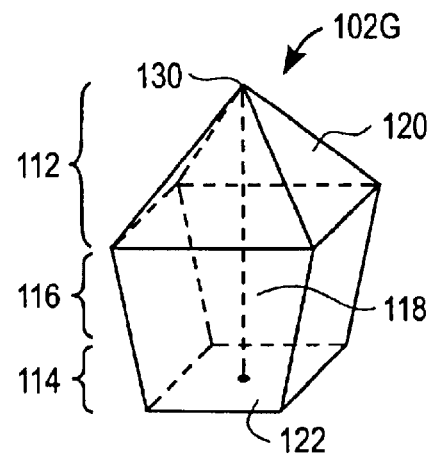
FIG. 7B is a perspective view of a tool tip also having a pointed end surface in accordance with another embodiment of the present invention.

FIG. 7A is a perspective view of a tool tip 102F having a pointed end surface in accordance with an embodiment of the present invention. FIG. 7B is a perspective view of a tool tip 102G also having a pointed end surface in accordance with another embodiment of the present invention. As with the tool tip 102 of FIG. 4, the tool tips 102F and 102G each has a first end portion 112, a second end portion 114, a mid portion 116, a central axis 118, a first end portion 112 comprising a first end surface 120, and a second end portion 114 comprising a second end surface 122.

As shown in FIG. 7A, the first end surface 120 of the tool tip 102F includes a point 128. The pointed end surface 120 of the tool tip 102F has a conical shape. As shown in FIG. 7B, the first end surface 120 of the tool tip 102G includes a point 130. The pointed end surface 120 of the tool tip 102G is defined by the intersection of a plurality of substantially flat surfaces.

Figure 8A:
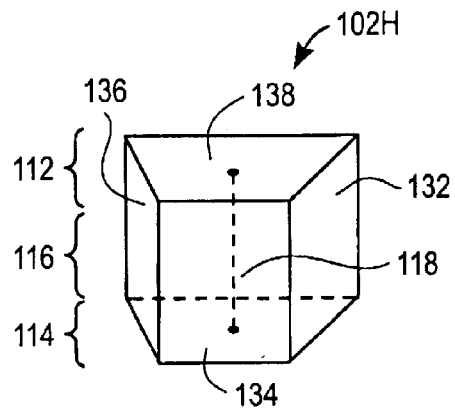
FIG. 8A is a perspective view of a tool tip having side surfaces parallel to the central axis 118 in accordance with another embodiment of the present invention.
Figure 8B:
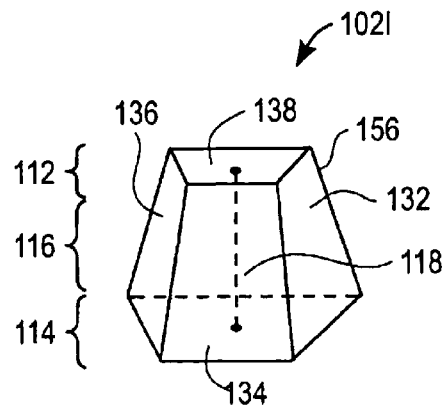
FIG. 8B is a perspective view of a tool tip having side surfaces forming angles with the central axis in accordance with another embodiment of the present invention.

FIG. 8A is a perspective view of a tool tip 102H having side surfaces parallel to the central axis 118 in accordance with another embodiment of the present invention. FIG. 8B is a perspective view of a tool tip 102I having side surfaces forming angles with the central axis 118 in accordance with another embodiment of the present invention. As with the tool tip 102, each of the tool tips 102H and 102I has a central axis 118, a first end portion 112, a second end portion 114, and a mid portion 116 between the first and second end portions 112 and 114. The mid portion 116 of each of the tool tips 102H and 102I comprises a at least one side surface 132.

In FIGS. 6A and 6B, the mid portion 116 comprises a plurality of side surfaces 132, 134, 136, and 138. As shown in FIG. 8A, each the side surfaces 132, 134, 136 and 138 of the tool tip 102H is parallel to the central axis 118. In other embodiments, only one or a select number of side surfaces are parallel to the central axis 118. As shown in FIG. 8B, each of the side surfaces 132, 134, 136, and 138 of the tool tip 102G forms an angle with the central axis 118. These angles as depicted in FIG. 8B are similar to one another. In another embodiment, these angles may be different from one another. That is, the slant of each side surface may be different. Furthermore, in other embodiments, only one or a select number of side surfaces form an angle with the central axis 118.

Figure 9A:
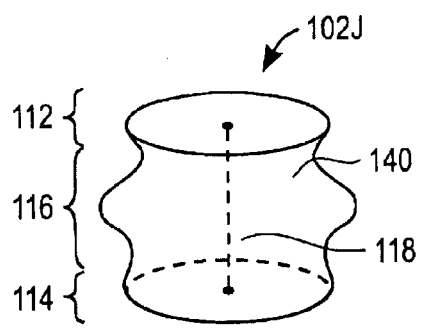
FIG. 9A is a perspective view of a tool tip having a curved side surface in accordance with another embodiment of the present invention.
Figure 9B:
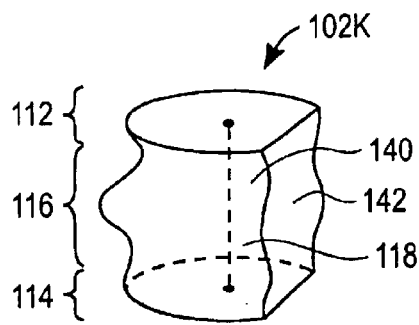
FIG. 9B is a perspective view of a tool tip having a curved side surface and a substantially flat surface in accordance with yet another embodiment of the present invention.

FIG. 9A is a perspective view of a tool tip 102J having a curved side surface in accordance with another embodiment of the present invention. FIG. 9B is a perspective view of a tool tip 102K having a curved side surface and a substantially flat surface in accordance with yet another embodiment of the present invention. As with the tool tip 102, each of the tool tips 102J and 102K has a central axis 118, a first end portion 112, a second end portion 114, and a mid portion 116 between the first and second end portions 112 and 114. The mid portion 116 of each of the tool tips 102H and 102I comprises a at least one curved side surface 140.

As shown in FIG. 9A, the tool tip 102J has a single curved side surface 140. The particular shape of this curved side surface 140 is shown for illustrative purposes only. In other embodiments, the shape of the curved side surface 140 may be varied. As shown in FIG. 9B, the tool tip 102K has a curved side surface 140 as well as a substantially flat side surface 142. The substantially flat side surface 142 as shown is parallel to the central axis 118. In another embodiment, such a substantially flat side surface may form an angle with the central axis 118. Furthermore, in other embodiments, tool tips may comprise other combinations of differently shaped side surfaces, such as a combination of more than one curved surfaces with more than one substantially flat side surface.

Figure 10A:
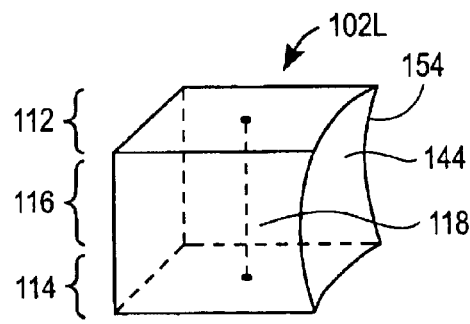
FIG. 10A is a perspective view of a tool tip having a concave side surface in accordance with another embodiment of the present invention.
Figure 10B:
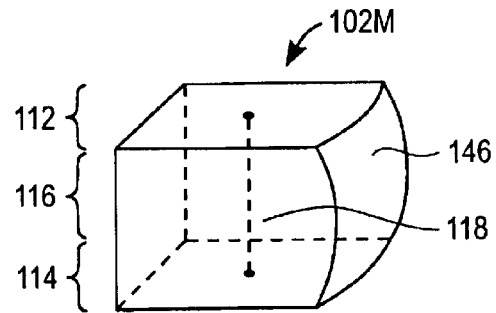
FIG. 10B is a perspective view of a tool tip having a convex side surface in accordance with yet another embodiment of the present invention.

FIG. 10A is a perspective view of a tool tip 102L having a concave side surface in accordance with another embodiment of the present invention. FIG. 10B is a perspective view of a tool tip 102M having a convex side surface in accordance with yet another embodiment of the present invention. As with the tool tip 102, each of the tool tips 102L and 102M has a central axis 118, a first end portion 112, a second end portion 114, and a mid portion 116 between the first and second end portions 112 and 114. As shown in FIG. 10A, the mid portion 116 of the tool tips 102L comprises a concave side surface 144. As shown in FIG. 10B, the mid portion 116 of the tool tips 102M comprises a convex side surface 146.

FIG. 11 is a perspective view of a tool tip 102N having a side edge in accordance with another embodiment of the present invention. As with the tool tip 102, the tool tip 102O has a central axis 118, a first end portion 112, a second end portion 114, and a mid portion 116 between the first and second end portions 112 and 114. As shown in FIG. 11, the mid portion 116 of the tool tips 102O comprises a side edge 148 defined by the intersection of two adjacent side surfaces 150 and 152. Here, note that the adjacent side surfaces 150 and 152 can also be viewed as one continuous, curved side surface. Also note that the side edge 148 of the tool tip 102N is substantially linear and is parallel to the central axis 118.

In other embodiments, the side edge may be curved and/or may form an angle with the central axis 118. For example, referring back to FIG. 10A, the tool tip 102L includes a side edge 154 that is curved. As another example, referring back to FIG. 8B, the tool tip 102I includes a side edge 156 that forms an angle with the central axis 118 of the tool tip 102I. In one specific embodiment, a tool tip includes a side edge that forms an angle of approximately 13 degrees with the central axis. In other words, the side edge in this specific embodiment forms an angle of approximately 87 degrees from a plane that is perpendicular to the central axis.

FIG. 12A is a perspective view of the tool tip 102 showing a cross section 158 taken from a plane parallel to the central axis 118 of the tool tip 102. The cross section 158 has four corners defined by four points 160, 162, 164, and 166 on the tool tip 102. Here, the cross section 158 is shown as being coplanar with the central axis 118. In other embodiments, a cross section parallel to the central axis 118 may be located elsewhere and not be in coplanar position with the central axis 118. FIG. 12B is a frontal view of the cross section 158.

FIG. 12C is a perspective view of the tool tip 102 showing a cross section 168 taken from a plane perpendicular to the central axis 118 of the tool tip 102. The cross section 168 has four corners defined by four points 170, 172, 174, and 176 on the tool tip 102. Here, the cross section 168 is shown to be taken near the center of the tool tip 102. In other embodiments, a cross section perpendicular to the central axis 118 may be located elsewhere, away from the center of the tool tip 102. FIG. 12D is a frontal view of the cross section 168.

Thus, different shapes of tool tips in accordance with the present invention can be illustrated by describing the cross sections of such shapes, taken from a plane either parallel or perpendicular to the central axis 118. The various cross sections in accordance with different embodiments of the present inventions are illustrated below.

Figure 13A:
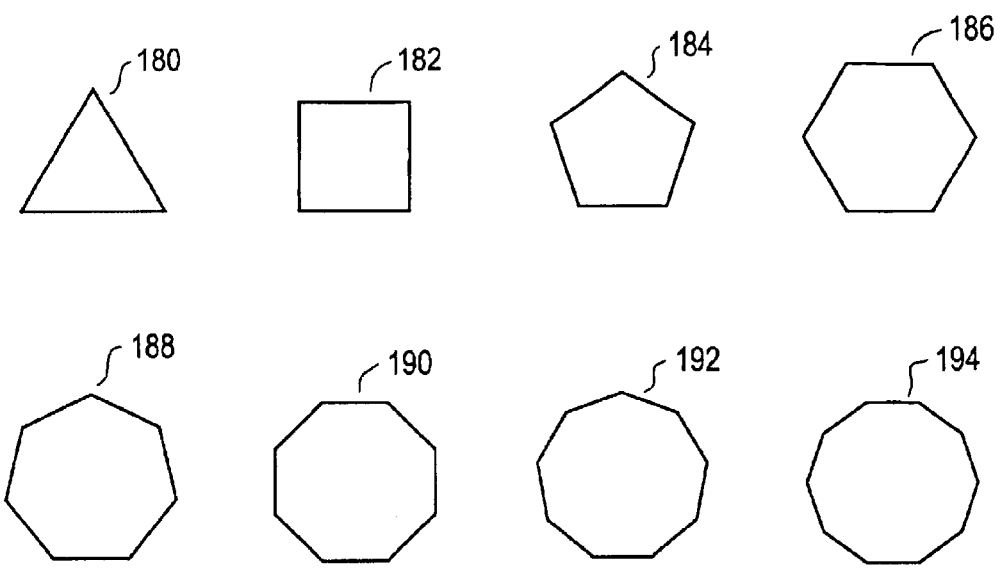
FIG. 13A illustrates tool tip cross sections having various polygonal shapes.
Figure 13B:
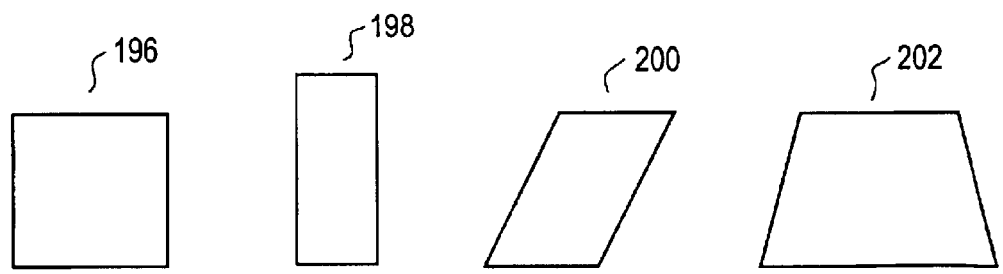
FIG. 13B illustrates tool tip cross sections having various quadrilateral shapes.

FIG. 13A illustrates tool tip cross sections having the following polygonal shapes: triangle 180, quadrilateral 182, pentagon 184, hexagon 186, heptagon 188, octagon 190, nonagon 192, and decagon 194. FIG. 13B illustrates tool tip cross sections having the following quadrilateral shapes: square 196, rectangle 198, parallelogram 200, and trapezoid 202. FIG. 13C illustrates tool tip cross sections having the following closed, curved shapes: circle 204 and oval 206.

FIG. 14A is a perspective view of a tool tip 204 having a opening 206 and a gear-shaped periphery 208 in accordance with another embodiment of the present invention. The tool tip 204 can be formed and placed according to methods discussed previously. The tool tip 204 may be used as a mechanical component, such as a moving part in a mechanical system. Thus, tool tips formed according to the present invention may also serve as mechanical structures, in addition to performing measurement and/or modification tasks. FIG. 14B is a cross-sectional view of the tool tip 204 having an opening and a gear-shaped periphery 208. Note that the cross-section of the tool tip 204 includes a plurality of concave portions, such as concave portions 210, and a plurality of convex sections, such as convex sections 212.

FIG. 15A is a perspective view of a tool tip 210 comprising a stock 212 and a shaped structure 214 formed from a portion of the stock 212. The shaped structure 214 may resemble any one of the previously mentioned tool tip shapes. In accordance with the present invention, the tool tip 210 has a maximum linear dimension of approximately 200 microns or less. Here, a maximum linear dimension of 200 microns means that the longest straight-line distance from one end to an opposing end of the tool tip 210, including the length of the stock 212, is 200 microns.

Using methods previously discussed, the shaped structure 214 may be formed by first attaching the stock 212 to a tool body, then maneuvering the tool body to control the position of the stock 212 as a portion of the stock 212 is lapped to form the shaped structure 214. The shaped structure 214 may then be positioned by maneuvering the tool body. This method of forming and positioning the shaped structure 214 allows accurate control of location and movement of the shaped structure 214 as it is used to perform measurements, modifications, and/or other tasks. As shown, the stock 212 as shown has a cylindrical shape. However, the stock 212 can also have a conical, pyramidal, rectanguloid, or other shape. FIG. 15B is cross-sectional view of the tool piece 210.

Numerous shapes have been disclosed. The particular orientation and/or shape of particular surfaces, edges, and other features of each tool tip may be selected according to characteristics of particular features of the target object to be measured and/or modified. For example, a particular curved side surface of a tool tip may be selected to conform with the expected surface shape of a region on the target object that is to be detected. Other orientation and/or shape of particular surfaces, edges, and other features of each tool tip may be selected to control the orientation of the tool tip once it is attached to a tool body.

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A single-body structure used as a tool tip for making modifications and/or collecting measurements on a target object, said single-body structure comprising:
   a first end portion;
   a second end portion opposite said first portion; and
   a mid portion between said first and second end portions,
      wherein a central axis can be defined extending from said first end portion to said second end portion, and
      wherein said single-body structure has a maximum linear dimension of approximately 50 microns or less.

2. The single-body structure of claim 1, wherein said single-body structure has a maximum linear dimension of approximately 25 microns or less.

3. The single-body structure of claim 1, wherein said single-body structure has a maximum linear dimension of approximately 10 microns or less.

4. The single-body structure of claim 1, wherein said single-body structure has a maximum linear dimension of approximately 1 micron or less.

5. The single-body structure of claim 1, wherein said single-body structure has a maximum linear dimension of approximately 100 nanometers or less.

6. The single-body structure of claim 1, wherein said single-body structure has a maximum linear dimension of approximately 10 nanometers or less.

7. The single-body structure of claim 1, wherein said single-body structure is used for making modifications on said target object.

8. The single-body structure of claim 1, wherein said single-body structure is used for collecting measurements on said target object.

9. The single-body structure of claim 1, wherein said single-body structure is used for making modifications or collecting measurements on said target object.

10. The single-body structure of claim 1, wherein said single-body structure is used for both making modifications and collecting measurements on said target object.

11. The single-body structure of claim 1, wherein said modifications include removal of material from said target object.

12. The single-body structure of claim 1, wherein said measurements include at least one surface dimension measurement of said target object.

13. The single-body structure of claim 1, wherein said measurements include at least one scanning probe microscope (SPM) measurement of said target object.

14. The single-body structure of claim 1, wherein one of said first and second end portions has a larger cross sectional area, in a plane perpendicular to said central axis, than does the other of said first and second end portions.

15. The single-body structure of claim 1, wherein one of said first and second end portions has a larger cross sectional diameter, in at least one direction perpendicular to said central axis, than does the other of said first and second end portions.

16. The single-body structure of claim 1, wherein at least one of said first and second end portions includes an end surface.

17. The single-body structure of claim 16, wherein said end surface is perpendicular to said central axis.

18. The single-body structure of claim 16, wherein said end surface forms a non-perpendicular angle with said central axis.

19. The single-body structure of claim 16, wherein said end surface is substantially flat.

20. The single-body structure of claim 16, wherein said end surface is curved.

21. The single-body structure of claim 16, wherein said end surface is convex.

22. The single-body structure of claim 16, wherein said end surface is concave.

23. The single-body structure of claim 16, wherein said end surface includes a point.

24. The single-body structure of claim 23, wherein said pointed end surface has a conical shape.

25. The single-body structure of claim 23, wherein said pointed end surface is defined by intersection of a plurality of substantially flat surfaces.

26. The single-body structure of claim 1, wherein said mid portion includes at least one side surface.

27. The single-body structure of claim 26, wherein said at least one side surface is parallel to said central axis.

28. The single-body structure of claim 26, wherein said at least one side surface forms an angle with said central axis.

29. The single-body structure of claim 26, wherein said at least one side surface is substantially flat.

30. The single-body structure of claim 26, wherein said at least one side surface is curved.

31. The single-body structure of claim 26, wherein said at least one side surface is convex.

32. The single-body structure of claim 26, wherein said at least one side surface is concave.

33. The single-body structure of claim 1, wherein said mid portion includes at least one side edge defined by intersection of two adjacent surfaces.

34. The single-body structure of claim 33, wherein said side edge is parallel to said central axis.

35. The single-body structure of claim 33, wherein said side edge forms a side edge angle with said central axis.

36. The single-body structure of claim 33, wherein said side edge is substantially linear.

37. The single-body structure of claim 33, wherein said side edge is curved.

38. The single-body structure of claim 1, wherein said single-body structure contains at least one cross section having a polygonal shape.

39. The single-body structure of claim 38, wherein said polygonal shape is selected from the group consisting of triangle, quadrilateral, pentagon, hexagon, heptagon, octagon, nonagon, and decagon.

40. The single-body structure of claim 39, wherein said quadrilateral is selected from the group consisting of square, rectangle, parallelogram, and trapezoid.

41. The single-body structure of claim 1, wherein said single-body structure contains at least one cross section having a curved, closed shape.

42. The single-body structure of claim 41, wherein said curved, closed shape is selected from the group consisting of circle and oval.

43. The single-body structure of claim 1, wherein said single-body structure contains at least one cross section having a combinational, closed shape comprising at least one substantially linear line and at least one curved line.

44. The single-body structure of claim 1, wherein said single-body structure contains at least one cross section having a closed shape including at least one concave portion.

45. The single-body structure of claim 1, wherein said single-body structure contains at least one cross section having a closed shape including at least one convex portion.

46. The single-body structure of claim 1, wherein said single-body structure contains at least one cross section having an interior border defining an opening within said at least one cross section.

47. The single-body structure of claim 1, wherein said single-body structure contains at least one cross section having a gear shape.

48. The single-body structure of claim 1, wherein said single-body structure contains at least one cross section having a closed shape that is asymmetrical.

49. A single-body structure as in any one of claims 38–48, wherein said at least one cross section is taken from a plane perpendicular to said central axis.

50. A single-body structure as in any one of claims 38–48, wherein said at least one cross section is taken from a plane parallel to said central axis.

51. The single-body structure of claim 1, wherein said single-body structure comprises diamond.

52. The single-body structure of claim 1, wherein said single-body structure comprises a material selected from the group consisting of carbon nitride, cubic boron nitride, boron carbide, silicon nitride, silicon carbide, tungsten carbide, and titanium nitride.

53. The single-body structure of claim 1, wherein said single-body structure comprises a material selected from the group consisting of silicon, germanium, gallium arsenide, tungsten, titanium, and copper.

54. The single-body structure of claim 1, wherein said mid portion contains at least one edge forming an angle of approximately 87 degrees from a plane perpendicular to said central axis.

55. A single-body structure used as a tool tip for making modifications and/or collecting measurements on a target object, said single-body structure comprising:
- a connecting end portion first end portion capable of being connected to a tool used to move said single-body structure relative to said target object;
- a non-connecting end portion opposite said connecting end portion; and
- a mid portion between said connecting and non-connecting end portions,
  - wherein a central axis can be defined extending from said connecting end portion to said non-connecting end portion, and
  - wherein said single-body structure has a maximum linear dimension of approximately 50 microns or less.

56. The single-body structure of claim 55, wherein said single-body structure has a first and a second cross sectional area, each in a separate plane perpendicular to said central axis, said first cross sectional area being smaller than said second cross sectional area and closer to said connecting end portion than said second cross sectional area.

57. The single-body structure of claim 55, wherein said single-body structure has a first and a second cross sectional diameter, each in a separate plane perpendicular to said central axis, said first cross sectional diameter area being smaller than said second cross sectional diameter and closer to said connecting end portion than said second cross sectional diameter.

58. The single-body structure of claim 55, wherein at least one of said first and second end portions includes an end surface.

59. The single-body structure of claim 58, wherein said end surface forms a non-perpendicular angle with said central axis.

60. The single-body structure of claim 58, wherein said end surface includes a point.

61. The single-body structure of claim 60, wherein said pointed end surface is defined by intersection of a plurality of substantially flat surfaces.

62. The single-body structure of claim 55, wherein said mid portion includes at least one side surface.

63. The single-body structure of claim 62, wherein said at least one side surface forms an angle with said central axis.

64. The single-body structure of claim 55, wherein said mid portion includes at least one side edge defined by intersection of two adjacent surfaces.

65. The single-body structure of claim 64, wherein said side edge forms a side edge angle with said central axis.

66. The single-body structure of claim 55, wherein said single-body structure contains at least one cross section having a polygonal shape.

67. The single-body structure of claim 55, wherein said single-body structure contains at least one cross section having a curved, closed shape.

68. The single-body structure of claim 55, wherein said single-body structure contains at least one cross section having a combinational, closed shape comprising at least one substantially linear line and at least one curved line.

69. The single-body structure of claim 55, wherein said single-body structure comprises diamond.

70. The single-body structure of claim 55, wherein said single-body structure comprises a material selected from the group consisting of carbon nitride, cubic boron nitride, boron carbide, silicon nitride, silicon carbide, tungsten carbide, and titanium nitride.

71. The single-body structure of claim 55, wherein said single-body structure comprises a material selected from the group consisting of silicon, germanium, gallium arsenide, tungsten, titanium, and copper.

72. A tool piece used as a tool tip for making modifications and/or collecting measurements on a target object, said tool piece comprising;
- a proximate end;
- a distal end; and
- a shaped structure formed on said distal end, said shaped structure having a maximum linear dimension of approximately 50 microns or less,
  - wherein said tool piece has a maximum linear dimension of approximately 200 microns or less.

* * * * *